(12) United States Patent
Sakai

(10) Patent No.: US 8,925,408 B2
(45) Date of Patent: Jan. 6, 2015

(54) ACTUATOR AVAILABLE IN CONTROLLED ENVIRONMENT

(75) Inventor: Tetsuya Sakai, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 316 days.

(21) Appl. No.: 13/455,551

(22) Filed: Apr. 25, 2012

(65) Prior Publication Data

US 2012/0285278 A1 Nov. 15, 2012

(30) Foreign Application Priority Data

May 12, 2011 (JP) ................................. 2011-106921

(51) Int. Cl.
| | | |
|---|---|---|
| *F16H 3/06* | (2006.01) | |
| *F16H 27/02* | (2006.01) | |
| *F16H 29/02* | (2006.01) | |
| *F16H 29/20* | (2006.01) | |
| *F16H 25/22* | (2006.01) | |
| *H02K 7/06* | (2006.01) | |
| *F16C 29/08* | (2006.01) | |
| *F16H 25/20* | (2006.01) | |
| *F16C 29/02* | (2006.01) | |

(52) U.S. Cl.
CPC .............. *F16H 25/2204* (2013.01); *H02K 7/06* (2013.01); *F16C 29/088* (2013.01); *F16H 2025/2034* (2013.01); *F16H 2025/2075* (2013.01); *F16C 29/02* (2013.01)
USPC ........................................ 74/89.4; 74/89.33

(58) Field of Classification Search
USPC ........... 74/89.32, 89.33, 89.4; 384/15, 42, 43, 384/44, 45; 277/641, 644, 905
See application file for complete search history.

(56) References Cited

U.S. PATENT DOCUMENTS

| | | | | | |
|---|---|---|---|---|---|
| 4,545,290 | A | * | 10/1985 | Lieberman | ........................ 92/88 |
| 4,934,835 | A | * | 6/1990 | Albert | ............................. 384/43 |
| 5,690,431 | A | * | 11/1997 | Schon | .............................. 384/15 |
| 6,000,292 | A | * | 12/1999 | Nagai et al. | ................... 74/89.33 |
| 6,142,030 | A | * | 11/2000 | Nagai et al. | ................... 74/89.32 |
| 6,241,230 | B1 | * | 6/2001 | Kawaguchi | ...................... 269/73 |
| 6,626,571 | B2 | * | 9/2003 | Kato et al. | ...................... 384/15 |
| 6,655,225 | B1 | * | 12/2003 | Nagai et al. | ................... 74/89.33 |
| 7,562,595 | B2 | * | 7/2009 | Kato | ............................... 74/89.4 |
| 8,337,084 | B2 | * | 12/2012 | Peschke et al. | ................. 384/15 |
| 2003/0005785 | A1 | * | 1/2003 | Ung et al. | ...................... 74/89.4 |
| 2003/0098551 | A1 | * | 5/2003 | Kato | .............................. 277/650 |
| 2010/0139426 | A1 | * | 6/2010 | Mori et al. | ................... 74/89.32 |

FOREIGN PATENT DOCUMENTS

| | | |
|---|---|---|
| JP | 2000197304 A | 7/2000 |
| JP | 2010138981 A | 6/2010 |

* cited by examiner

*Primary Examiner* — Troy Chambers
*Assistant Examiner* — Jake Cook
(74) *Attorney, Agent, or Firm* — Browdy and Neimark, PPLC

(57) ABSTRACT

A clean environmental actuator is less in weight, height in transverse section and compact in construction, even with ensuring accurate position control and conformable to high speed operation and high acceleration/deceleration. Both a bed and a slider are stowed in an enclosure and packings are in T-slots in side walls of the bed to seal clearances between the bed and the enclosure. The enclosure is composed of an end bracket to cover one end of the bed, a motor bracket to cover another end of the bed, a pair of side coverings to enclose the side surfaces and tops of the side walls of the bed, a sealing panel to cover an upward opening between the side coverings, and a table covering to overlay an area of the sealing panel lying on the slider and side areas of the table bulging out from side edges of the sealing panel.

1 Claim, 6 Drawing Sheets

ACTUATOR AVAILABLE IN CONTROLLED ENVIRONMENT

FIELD OF THE INVENTION

The present invention relates generally to an actuator intended to operate in a controlled or contamination-free environment. More particularly, it relates to an actuator available in a controlled environment in which an elongated bed is enclosed hermetically inside an airtight enclosure and a table system composed of a slider and a drive unit to move a table built integral with the slider in lengthwise direction of the bed towards a desired position to provide accurate position control.

BACKGROUND OF THE INVENTION

Most actuators have conventionally found a diversity of applications including assembling apparatus, measurement instruments, various machines, industrial robots, semiconductor manufacturing equipment and so on to drive and guide a workpiece for linear back-and-forth movement. The actuators used of late years in machinery as recited earlier have need of a high cleanliness class because they are desired to work in a controlled environment as in a clean room, in addition to conforming to growing demands for high speed operation and high acceleration/deceleration, high accuracy and compactness in construction to encourage the recently remarkable downsizing and high-functionality in electronics engineering technology.

In the commonly-assigned Japanese Laid-Open Patent Application No. 2010-138,981, referred to later as patent literature 1, there is disclosed an actuator which has an elongated frame of a U-shape in transverse section and a slider installed in the frame to move or slide lengthwise of the frame, the elongated frame and the slider being entirely made of extrusions of a light alloy which weighs less than steel. Moreover, race members, in which rolling elements run through, fit in the frames, only the race members being made of steel alloy drawn or pulled to the desired shape. As a result, the actuator is reduced in weight, smaller in height in a transverse section and slimmer in its construction. With the prior actuator constructed as stated earlier, both the frame and the slider are mainly made of extrusions of the light alloy. Mating construction between the frame and the race members has a simple structure and an upper sealing member is placed between the frame and the slider. Grooves having a T-shape in transverse section are cut on outward surfaces of side walls of the frame. The frame having a U-shape in cross section is provided on the side walls thereof with recesses having a dovetail configuration in a transverse section to fit over the race members and flanges extending to form upper edges of the recesses. The slider is also made with recesses having a rectangular shape into each of which the race member fits snugly. There is further provided a driving unit to force movement of the slider with respect to the frame.

Another actuator is described in Japanese Laid-Open Patent Application No. 2000-197,304 referred later as patent literature 2, which is composed of a housing having an opening, a slider allowed to move along the opening, and a sealing plate to close the opening. This prior actuator constructed as stated earlier is envisaged keeping debris, dust and so on, which might occur inside the actuator due to the movement of the slider, from escaping out of the actuator while excluding the contaminants, foreign materials and so on from entering the actuator. For invalidation of pumping phenomenon caused by back-and-forth movement of the slider, a hollow space is provided inside the housing to extend lengthwise in the housing and a plurality of holes on the side walls of the housing to communicate constantly at any given location between a leading compartment and a trailing compartment across the slider through the hollow space.

The prior actuator described in the patent literature 1 was unfit to work in a clean environment because the frame as shown in FIG. 1 of the patent literature 1 remains open to the surrounding atmosphere and therefore the debris and/or dirt which emanates as the slider moved is spread or diffused around. Further, the prior actuator described in the patent literature 2 was hard to maintain a high cleanliness class in various modern machines in which the slider operated with high-speed operation and/or high acceleration and/or deceleration, because of getting entirely so bulkier in volume as to need to suck or force a large amount of air inside the housing.

According to the present invention, there has been developed an improved actuator which is expected to work in the clean environment of the cleanliness class 3, higher than in the prior actuator recited earlier in the patent literature 2. The actuator of the present invention makes it possible to suck air inside the actuator and go on to cast off out of the clean room lest the debris and dirt caused by the movement of the actuator is released in the clean room.

SUMMARY OF THE INVENTION

The present invention, therefore, has as its principal object to refine the actuator disclosed in the patent literature 1 recited above to overcome the major issues discussed earlier. The entire concept of the present invention is to provide an actuator which weighs less even with conforming to high speed operation and high acceleration/deceleration. In particular, the present invention is intended to provide an actuator befitted to work in the clean atmosphere of high cleanliness class and composed of a bed of U-shape in transverse section less in height in a transverse section and compact in construction, the bed being shrouded in an airtight enclosure, and further a sensor installed outside the enclosure to make an interior space defined by the enclosure compact and a space inside the bed smaller, whereby an airtightness between the bed and the enclosure is enhanced to require less amount of air to be sucked in the small space inside the bed, and suction port disposed with design consideration of effective suction.

The present invention is concerned with an actuator befitted to work in a clean environment, comprising: an elongated bed having a U-shape in a transverse section having a bottom plate and a pair of side walls standing at side edges of the bottom plate to extend lengthwise in parallel with each other, a slider movable lengthwise between the side walls of the bed through rolling elements, a driving unit to force the slider back-and-forth with respect to the bed, the enclosure shrouding lengthwise opposite ends, lengthwise side surfaces and tops of the bed, and a table integral with the slider and exposing itself out from the tops of the enclosure;

wherein the enclosure is composed of an end bracket covering one end of the bed, a motor bracket covering another end of the bed, a pair of side coverings enclosing the side surfaces and tops of the side walls of the bed, one to each side wall, a sealing panel covering from above an upward opening between the side coverings, and a table covering overlaying from above an area of the sealing panel lying on an upper surface of the slider and side areas of the table bulging sidewise out from side edges of the sealing panel; and wherein the side walls of the bed each have a groove of a T-slot into which a packing fits to make close engagement or contact with the side coverings enclosing the side surfaces of the bed to close hermetically a clearance between the side covering and the bed.

In the present invention, an actuator is disclosed in which the packing is constituted with a packing major part fitting into the groove of the T-slot, and further including a locking part bulging out from the major part to make engagement with a flanged portion of the T-slot, a bottom lip extending out from the major part to come into abutment against a bottom of the T-slot, and a sealing lip extending out from the major part to extend through an opening of the T-slot so as to come into close contact with the side covering.

In the present invention, an actuator is disclosed in which the side covering has a substantially L-shape in a transverse section composed of a lengthwise side plate to come into close engagement with one of the lengthwise side walls of the bed and a lengthwise upper plate lying perpendicular to the side plate to extend over the top of the side wall, the side plate being depressed inwardly of an outward surface of the side plate at a location above the side wall of the bed along a lengthwise corner of the L-shape in a transverse section, thereby forming a groove of a T-slot to install the sensor therein and correspondingly in reverse to the groove providing on a bottom of the groove a shoulder which is able to be snugly placed against the top of the side wall of the bed.

In the present invention, an actuator is disclosed in which the slider has a vent extending lengthwise through between the forward and aft ends of the slider at an upper location closer to the table in order to prevent a pumping phenomenon caused by movement of the slider in a closed interior space inside the enclosure.

In the present invention, an actuator is disclosed in which a drive unit is composed of a motor and a ball screw assembly, the ball screw assembly being comprised of a ball screw shaft driven by the motor and supported for rotation at lengthwise opposite ends by bearings in the end bracket and the motor bracket, and a lead nut or ball screw nut mating with the ball screw shaft and fastened to the slider, and further wherein the end bracket and the motor bracket each have a pair of suction ports to suck air with airborne dirt and dust out of the enclosure, the suction ports being disposed neighboring the lengthwise opposite ends of the ball screw shaft bearings, where the airborne dirt and dust are most liable to occur.

With an actuator befitted to work in a clean environment constructed as stated earlier, the fundamental construction constituted with the elongated bed of U-shape in a transverse section and the slider moveable lengthwise in the bed through rolling elements, as being high in mechanical strength, is favorable for highly accurate position control and conformable to high speed operation and high acceleration/deceleration. Further, the fundamental construction as stated just above helps make the actuator weigh less, have a reduced height and be further compact in its construction. In the actuator of the present invention, the enclosure to enclose the bed therein is constructed to better ensure that it is airtight. In particular, the packings are installed in the conventionally existing T-slots in the side walls of the bed to securely seal up the clearances between the bed and the side coverings. In addition, the sensors are placed outside the enclosure to make it possible to enclose both the bed and the slider with the enclosure having a simple construction. As a result, the volume inside the enclosure in which the slider moves in the bed as a whole may be less so that the purification of the air with airborne contaminants to accomplish a high cleanliness class requires a lower amount of sucked air. With the actuator in which the side plate is depressed inwardly of an outward surface of the side plate at a location above the side wall of the bed to form a groove of T-slot in the side plate to install the sensor therein, the volume inside the enclosure may be reduced even in part at least and further there is no need to provide any separate sensor rails, so that the purification of the air with airborne contaminants to accomplish a high cleanliness class requires a lower amount of sucked air. Moreover, the shoulders provided on the side coverings, as a result of being able to be snugly placed against the tops of the side walls of the bed, make it easier to place the side coverings on the tops of the side walls of the bed. With the actuator in which the slider has a vent extending lengthwise between forward and aft ends of the slider at an upper location closer to the table, the slider is allowed to move or slide smoothly, because the air inside the enclosure is subjected to no compression. Further, there is no possibility of leakage of compressed air out of the sealing panel so that the purification of the air with airborne contaminants to accomplish a high cleanliness class requires a lower amount of sucked air. With the actuator of the present invention, moreover, the air with airborne contaminants can be emitted simply out of the clean room by just installing a pair of suction ports in the end bracket and the motor bracket, respectively, so that the purification of the air with airborne contaminants to accomplish a high cleanliness class requires a lower amount of sucked air.

DETAILED DESCRIPTION OF THE PREFERRED EMBODIMENT

Figure 1:
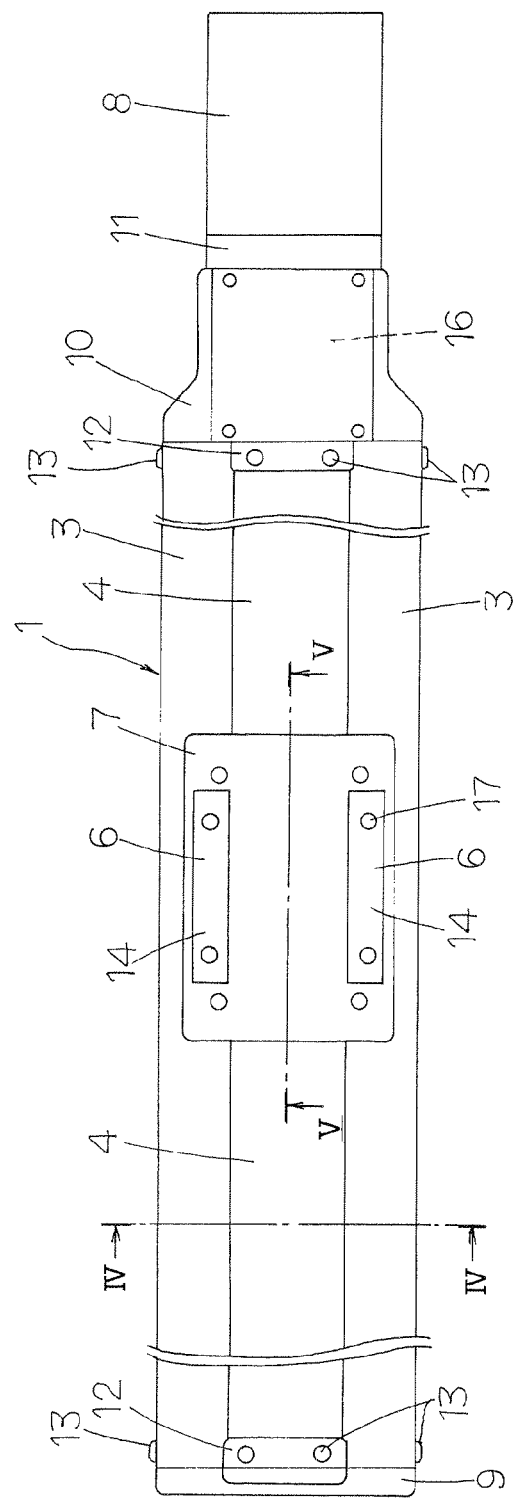
FIG. 1 is a view in plan, partly broken away, of a preferred embodiment of an actuator befitted for working in a clean environment constructed according to the present invention.
Figure 2:
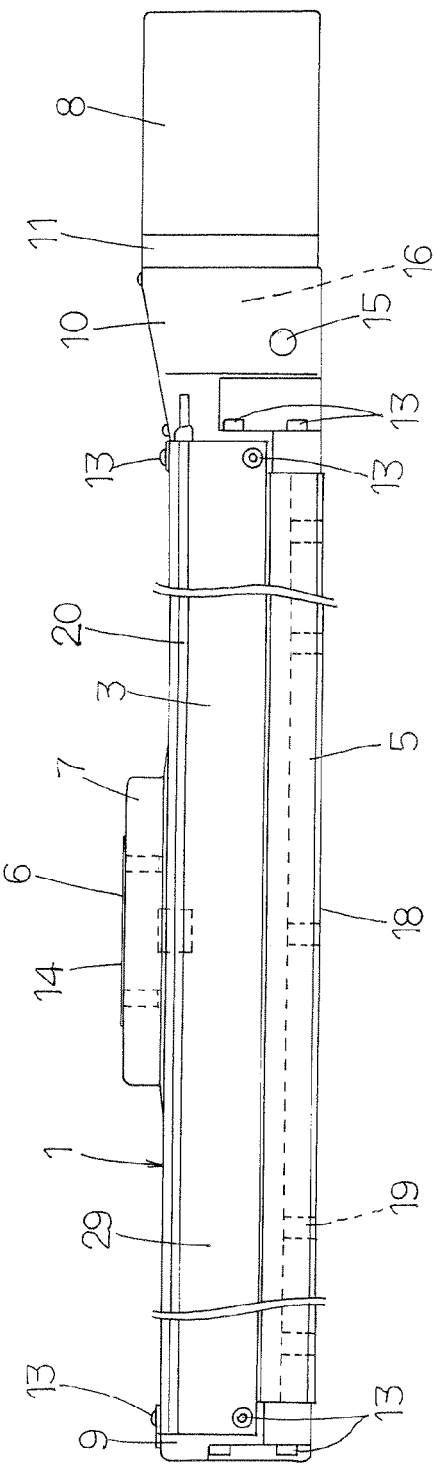
FIG. 2 is a view in front elevation of the actuator of FIG. 1.
Figure 3:
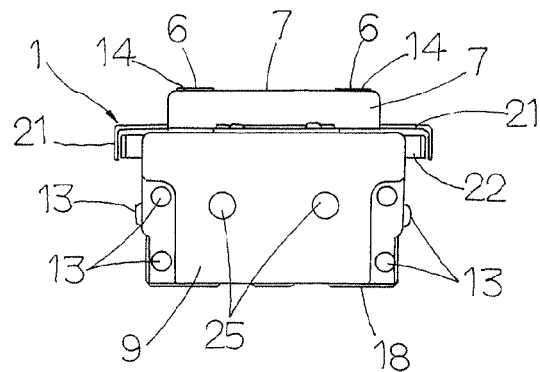
FIG. 3 is a view of side elevation of the actuator with sensors shown in FIG. 2.

The actuator befitted to work in a clean environment according to the present invention is intended to be used to control positions in a diversity of machinery, such as semiconductor manufacturing equipment, LCD panel manufacturing equipment and so on, which are needed to work in any controlled atmosphere including clean rooms, laboratories and the like. Referring now in detail to the accompanying drawings, an actuator designed to work in a clean environment according to the present invention will be explained below. While based on the actuator serving as the accurate position-control table disclosed in the patent literature 1 as stated earlier, an actuator befitted to work under a clean environment or atmosphere of the present invention, called a clean environmental actuator hereinafter, has been developed in which the actuator is encased or enclosed with a housing or enclosure constituted with sealing members including a variety of coverings and so on to endure working in a clean environment. With the clean environmental actuator of the present invention, a housing or enclosure 1 composed of sealing members encases an elongated bed 5 therein to keep dirt and dust against going in and out of the enclosure 1. There is further provided a table 6 having thereon a mounting surface 14 extending out of the enclosure 1. The table 6 is forced to move lengthwise with respect to the bed 5 by a driving unit, such as a motor 8, to a desired or target position. The enclosure 1 is composed of an end bracket 9 to cap an end of the bed having a U-shape in a transverse section, a motor bracket 10 to cover another end of the bed 5, a pair of side coverings 3 to mantle outward sides and tops or upper surfaces of lengthwise sidewalls of the U-shaped bed 5 respectively, a sealing panel 4 to close an upward opening of the bed 5 between the side coverings 3, and a table covering 7 to cover from above a slider 2 movable relatively to the bed 5, inclusive of the portion of the table 6 that exposed sidewise out of side edges of the sealing panel 4 lying on the slider 2. The side coverings 3 are each made at their lengthwise opposite ends with holes 58 (refer to FIG. 11) which are used to fasten the end bracket 9 and the motor bracket 10 to the side coverings 3 with screws 13 as shown in FIG. 2. As the side coverings 3 are not secured to the bed 5 midway between the opposite ends thereof, lengthwise packings described later are placed to seal clearances left between the bed 5 and the side coverings 3.

Figure 4:
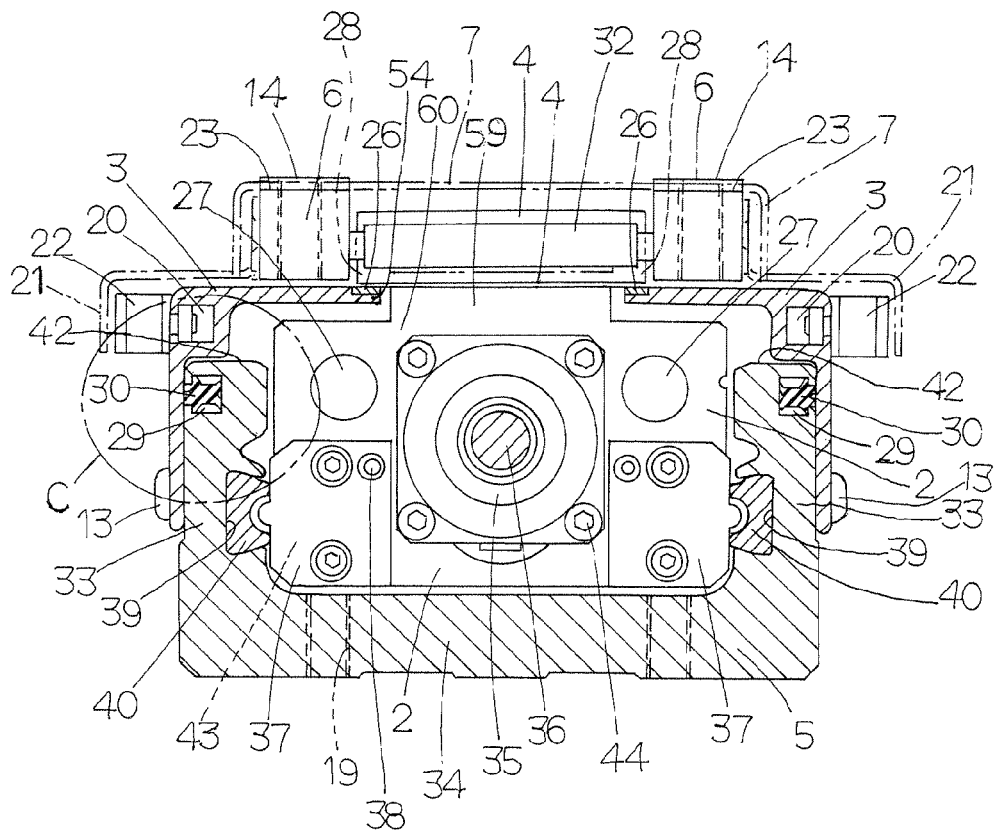
FIG. 4 is a view in transverse section of the actuator with sensors, the view being taken on a plane lying on the line IV-IV of FIG. 1, but in which a table cover is shown as being removed from a table.

The clean environmental actuator of the present invention is envisaged meeting the demand of high cleanliness class when used in the clean environment. Different sorts of coverings encase snugly around the bed 5 having a U-shape in a cross section to provide the enclosure 1 having a smaller interior or compact in space, as well as being highly airtight so as to require a lower amount of air to be sucked for air purification inside the enclosure 1, thereby accomplishing a high cleanliness class (class 3), combined with the design consideration of effective suction. The clean environmental actuator of the present invention, as shown in FIG. 4, is mainly composed of the elongated bed 5 having a U-shape in transverse section, having a bottom plate or bottom wall 34 and a pair of side walls 33 standing at side edges of the bottom wall 34 to extend lengthwise in parallel with each other, the slider 2 being movable lengthwise with respect to the side walls 33 of the bed 5 through rolling elements, and the driving unit or motor 8 to force the slider 2 back-and-forth with respect to the bed 5. All the fore and aft ends, both sides and tops of the bed 5, as shown in FIGS. 1 to 4, are shrouded or cloaked with the enclosure 1 comprised of sealing members. The paired side walls 33 of the bed 5 have lengthwise recesses 39 to fit over race members 40. Race members 40 each have a raceway groove along which the rolling elements are allowed to roll. The race members 40 installed in the bed 5 and other race members 61 on the carriage 60 in the actuator of the present invention are shown in detail in the patent literature 1 recited earlier, the disclosure of which is incorporated herein by reference.

Figure 6:
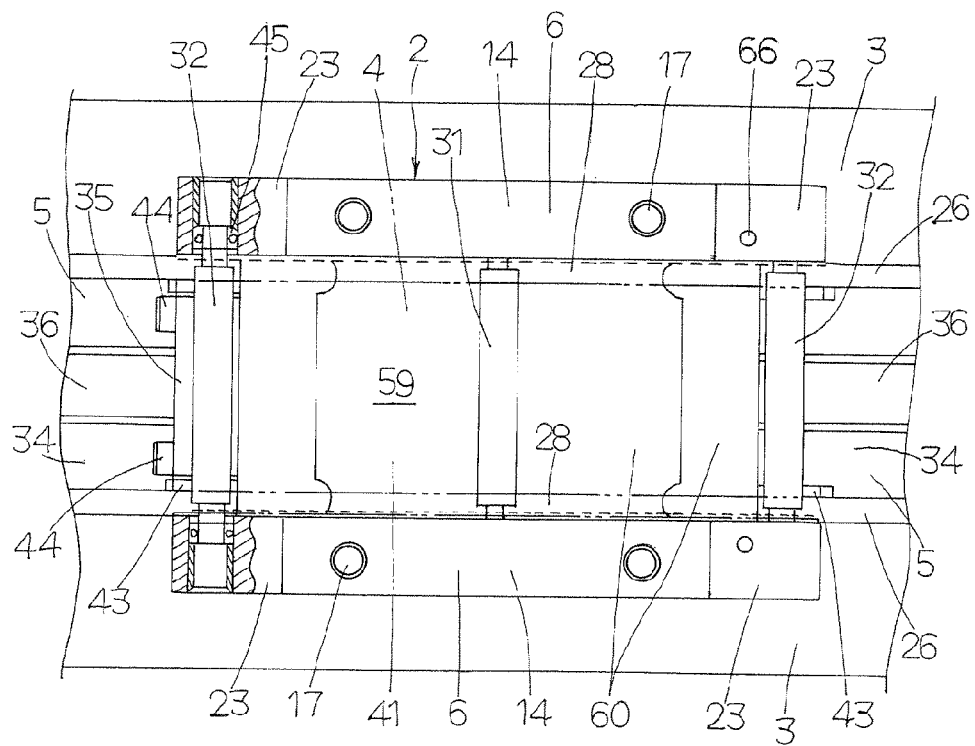
FIG. 6 is a view in plan of the table of the actuator, in which the table cover and a sealing panel are both shown as being removed from the table and bearings of a guide roller are shown as being partially broken away.
Figure 7:
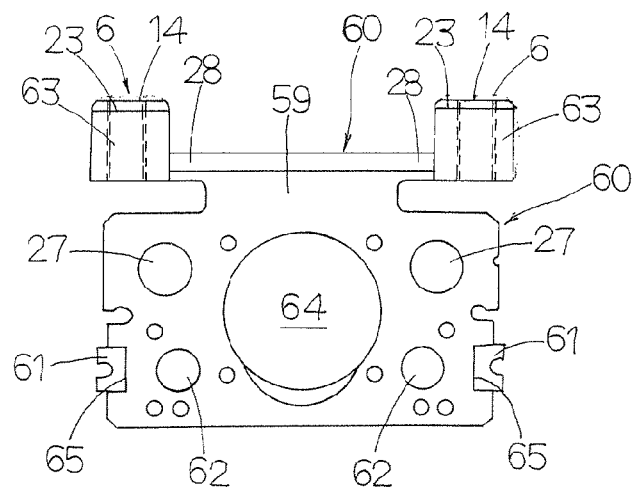
FIG. 7 is a view in end elevation of a casing for a slider in the actuator of the present invention.

The slider 2 is composed of the carriage 60, end caps 43 (refer to FIG. 6) fastened to lengthwise opposite end caps 43 and end seals 37 secured on outward surfaces of the end caps 43 and made therein with lubricant ports 38. The carriage 60 of the slider 2, as shown in FIG. 7, has a central through-hole 64 through which a lead shaft or ball screw shaft 36 axially extends, a pair of vents lying diagonally upside above the through-hole 64 on two sides, a pair of return passages 62 lying diagonally downside below the through-hole 64 on two sides, and a pair of recesses 65 extending lengthwise on widthwise opposite side surfaces of the carriage 60 to fit over race member members 61 in opposition to the race members 40 on the bed 5. Moreover, the carriage 60 is raised upward into a necked portion 59 which in turn bulges sidewise out to form a conjoining portion 28 through which the table 6 having a pair of flanges is made integral with the carriage 60. More particularly, the table 6 is provided on both sides thereof with the flanges extending lengthwise of the carriage 60 or in the sliding direction of the carriage 60. The table 6 is situated just above the widthwise opposite side regions of the carriage when the conjoining portion integral with the table 6 has bulged sidewise out through between the side coverings 3 and the sealing panel 4 lifted by a guide roller 31. On the top surface of the table 6, there are provided the mounting surface 14 exposed out of the table covering 7 to fasten any component, including a workpiece and so on, and another mounting surface 23 lying below the mounting surface 14 to install the table covering 7. Thus, the table covering 7 encloses everywhere but the mounting surface 14 throughout the mounting surface 23 for the table covering 7 on the table 6 and the flanges of the table 6.

The first constructional feature in the clean environmental actuator of the present invention resides in ensuring the airtightness in the enclosure 1. To this end, the packings 30 of an elastic material, such as a rubber and the like, are installed between the bed 5 and the side coverings 3 to close hermetically clearances which exist between the side walls 33 of the bed 5 and side plates 55 of the side coverings 3 because the side coverings 3 are fastened at only their lengthwise opposite ends to sides of the end bracket 9 and the motor bracket 10 by means of the screws 13. The packings 30 are installed with the help of T-slots 29 which have conventionally existed lengthwise of the side walls of the prior bed to install any sensors therein. More particularly, the packings 30 are shaped to have a specific configuration in a transverse section conformable to the existing T-slots 29 and also adapted to fit snugly between the bed 5 and the side coverings 3. Thus, the packings 30 are each installed throughout the overall length of the relevant T-slot 29.

The second constructional feature in the clean environmental actuator of the present invention resides in making the interior space of the enclosure 1 small. To this end, the side coverings 3 have grooves 20 formed as a T-slot to install sensors therein, which cave or sink in the enclosure 1 in such a way so that they are surrounded with walls of the enclosure 1. More particularly, sensors 22 are not installed in the bed as in the prior art, but in the grooves 20 in the side coverings 3 and correspondingly the interior space in the enclosure 1 may be made smaller compared with the prior construction. The walls to define the grooves 20 at their bottom portions 67 are made into shoulders 49 which are able to be snugly placed against the tops 42 of the side walls 33 of the bed 5 to support the side coverings 3 on the side walls 33 with accuracy, safety and ease. The sensors 22 installed inside the grooves 20 are protected with shield plates 21 which are made at the side edges of the table 6.

Moreover, the third constructional feature in the clean environmental actuator of the present invention is to prevent or minimize leakage of compressed air. Such leakage would be caused after the sealing panel 4 covering from above the bed 5, has been edged out by the effect of air compressed in, for example, the forward or leading space in front of the slider 2. The compressed air could be caused by the pumping phenomenon caused by back-and-forth movement with high speed and/or acceleration/deceleration of the slider 2 in a lengthwise direction of the bed 5 inside the enclosure 1 having a smaller volume interior space. To this end, vents 27 extend lengthwise through the slider 2 between forward and aft ends of the slider 2 at locations a little closer to the sealing panel 4, more particularly, at locations in an upper half of the carriage 60. As for the design consideration of effective suction, moreover, a pair of suction ports 25 is formed in a bearing component for the ball screw shaft 36, from which dust and dirt are most likely to arise, namely, in the end bracket 9 nearer to a bearing against which one end of the ball screw shaft 36 is disposed. On the side of the motor bracket 10, an end part having therein a bearing to support another end of the ball screw shaft 36 is provided with a pair of communicating holes (not shown) which is open to the space inside the bed 5. Further, other suction ports 15 interconnecting with the communicating holes are made in side walls of a coupling box 16 which is connected to the end part to receive therein a coupling set to join the motor 8 to the ball screw shaft 36. Moreover, the bed 5, slider 2 and the table 6 are made of a high tensile aluminum alloy, which is light in weight and easy to work.

On the top surface of the table 6, the mounting surface 14 to fasten any component, including a workpiece and so on, is provided with exposed out of the enclosure 1 and the mounting surface 14 has a pair of threaded holes 17. On a lower surface of the bed 5, another mounting surface 18 used to fasten the bed 5 to any stationary part, such as a machine bed and so on, and this mounting surface 18 has a plurality of threaded holes 19 positioned at regular intervals in the lengthwise direction of the bed 5. With the clean environmental actuator constructed as stated earlier, the bed 5, slider 2, the table 6 integral with the slider 2, the end bracket 9, the motor bracket 10 and the paired side coverings 3 are all made of extrusions of a light alloy, for example high tensile aluminum alloy which weighs less than steel. With the clean environmental actuator of the present invention, moreover, race members 40, 61, in which the rolling elements run through, are made of a steel alloy drawn or pulled to the desired shape as disclosed in the commonly-assigned Japanese Laid-Open Patent Application No. 2010-138,981 referred to earlier. As a result, the major portion of the clean environmental actuator other than the race members is made of a material weighing less, and the clean environmental actuator of the present invention is lower in weight, smaller in height in transverse section and slimmer in construction, even with a high stiffness enough to make position control with high accuracy and conform to severe operation with high speed, high acceleration/deceleration.

The clean environmental actuator of the present invention has a drive unit to force or move the slider 2 with respect to the bed 5 to a desired position with accuracy. The drive unit is placed inside the enclosure 1 and composed of a ball screw assembly and the motor 8. The ball screw assembly is comprised of the ball screw shaft 36 supported for rotation at lengthwise opposite ends by bearings, not shown, in the end bracket 9 and the motor bracket 10, and a lead nut or ball screw nut 35 fastened to one end of the slider 2 with screws 44 to mate with the ball screw shaft 36. The motor 8 is installed in the motor bracket 10 to drive rotationally the ball screw shaft 36.

The end bracket 9 is fastened to the one end of the bed 5 with the screws 13. On an inside end of the enclosure 1, there is provided a bearing, not shown, to keep the ball screw shaft 36 at the middle in the widthwise dimension of the bed 5. The end bracket 9 has the paired suction ports 25 disposed on both sides of the bearings and neighboring the bearings, which are major sources of contaminants of dirt and dust. Thus, the air contaminated with airborne dust is emitted or sucked out of the enclosure 1 through the suction ports 25. Further, the suction ports 25 are made in the form of threaded holes adapted for coupling with any screwed fittings. Any one of the suction ports 25 may be connected with, for example a suction pipe, not shown, of an air purifier such as a filter and so on to clean the air. All the suction ports 25 but one put to air purification use are plugged with closures, not shown, to keep the interior of the enclosure 1 airtight.

The motor bracket 10 is secured with the screws 13 to the end of the bed 5 lengthwise opposite to the end bracket 9. On an inside end of the enclosure 1, there is provided a bearing, not shown, to keep the ball screw shaft 36 at the middle in the widthwise dimension of the bed 5. The motor bracket 10 extends outwardly from the inside end thereof in the lengthwise direction to form the coupling box 16 on whose outermost end is mounted a motor attachment 11. The motor 8 is installed on the motor attachment 11. The coupling box 16 has an airtight compartment to stow therein the coupling to connect a shaft end of the ball screw shaft 36 extended out through the inside end to a motor shaft extended out through the outermost end.

With the motor bracket 10, a pair of holes, not shown, bored through into the coupling box 16, is formed on both sides neighboring the bearings on the inside end, one on each side. Further, the suction ports 15 are made on side walls of the coupling box 16, one on each side wall, to communicate with the paired holes so as to make it possible to emit the air contaminated with airborne dust through the suction ports 15 out of all of the enclosure 1 and the coupling box 16. Like the suction ports 25 in the end bracket 9, the paired suction ports 15 are made in the form of threaded holes adapted for coupling with any screwed fittings. Any one of the suction ports 15 may be connected with, for example, a suction pipe, not shown, of an air purifier such as a filter to clean the air contaminated with airborne dust. All the suction ports 15 but one put to air purification use are plugged with closures, not shown, to keep the interior of the enclosure 1 airtight.

Figure 10:
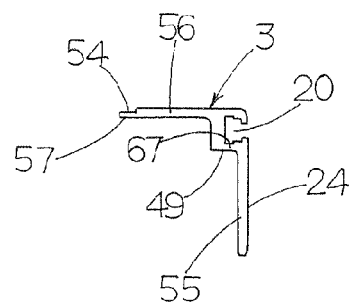
FIG. 10 is a view in end elevation showing one side cover of paired side covers installed in the actuator of FIG. 1.
Figure 11:
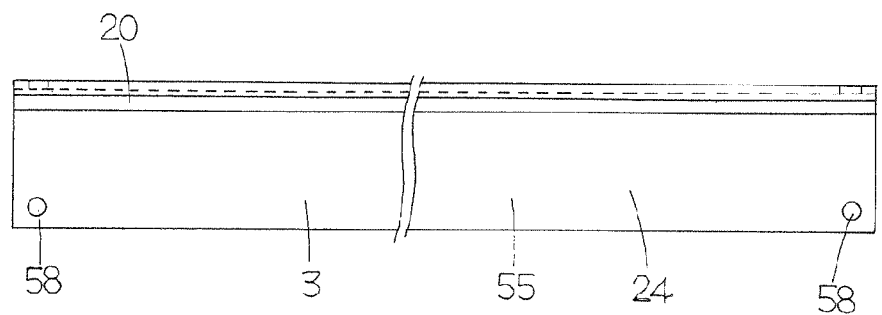
FIG. 11 is a view in front elevation of the side cover of FIG. 10.

The paired side coverings 3 are placed along the sides of the bed 5, one on each side, to extend lengthwise across the overall length of the bed 5 to cover over the respective sides and the tops in part of the bed 5. The side coverings 3 are fastened, at one end thereof, to the end bracket 9 with the screws 13 and at an opposite end thereof to the motor bracket 10 with screws 13. The side coverings 3, particularly as shown in FIGS. 4, 10 and 11, each have a substantially L-shape in transverse section, which causes the lengthwise side plate 55 to come into engagement with the associated lengthwise side wall 33 of the bed 5 and a lengthwise upper plate 56 lying perpendicular to the side plate 55 to extend over the top 42 of the associated side wall 33. With the side coverings 3, moreover, the side plate 55 gets depressed or caved lengthwise below an outward surface 24 of the side plate 55 along or nearby a lengthwise corner of the L-shape in transverse section to form a groove 20 of T-slot to install the sensor therein. The inward wall to define the groove 20 at the bottom portion is made into the shoulder 49, which is able to be snugly placed against the top 42 of the side wall 33 of the bed 5. In other words, the side plate 55 of the side covering 3 is dented inwardly along the lengthwise corner of the L-shape in transverse section to provide the T-slot groove 20 to install the sensor therein and the shoulder 49 correspondingly in reverse to the groove 20 bulging inwardly nearby the lengthwise corner of the L-shape. The upper plates 56 of the side coverings 3 are made partially smaller in thickness along their lengthwise edges 57 to provide recessed rims 54, one on each upper plate 56, over which strips 26 of magnetic sheet are respectively installed to extend lengthwise of the side coverings 3 in widthwise opposition to each other above the tops 42 of the bed 5. The sealing panel 4 to cover the tops 42 of the bed 5 is attracted magnetically to the magnetic strips 26 to hermetically seal boundaries between them.

Figure 5:
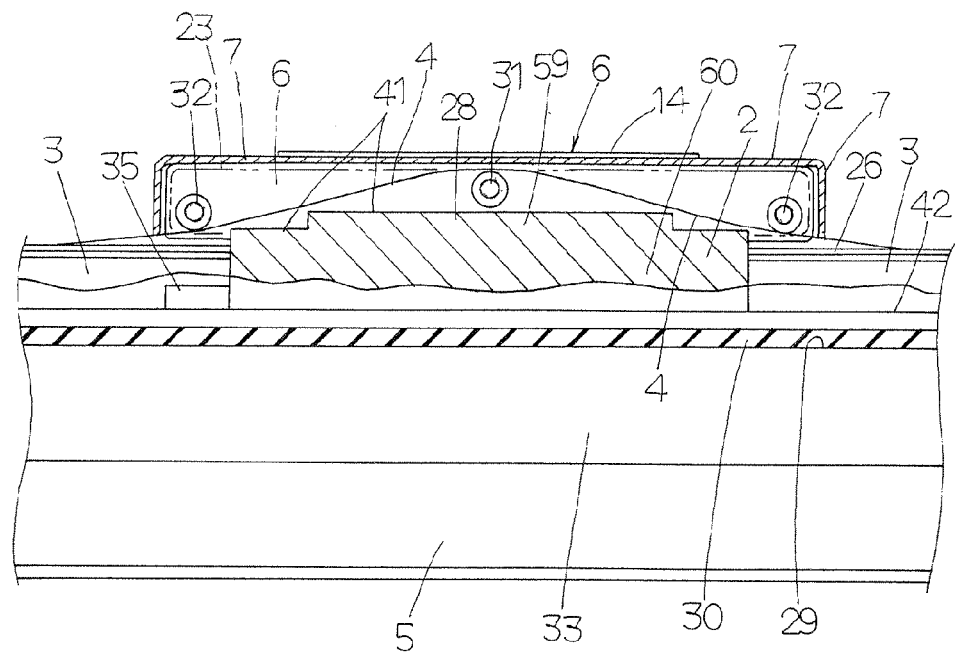
FIG. 5 is a fragmentary view in longitudinal section of the table of the actuator, the view being taken on a plane lying on the line V-V of FIG. 1, but in which a side cover on this side is shown as being removed from a table.

The sealing panel 4 is stretched above the tops 42 of the bed 5 to cover lengthwise an opening between the upper plates 56 of the side coverings 3 and fastened at opposite ends to upper surfaces of the end bracket 9 and the motor bracket 10 through presser plates 12 by screws 13. The sealing panel 4 is made of stainless steel attractive to the magnetic strips 26 and therefore attracted to the side covering 3 with the help of the magnetic strips 26. The sealing panel 4, as shown in FIGS. 5 and 6, is guided while being lifted upwards across the table 6 by the guide roller 31 at a region parallel with the carriage 60 of the slider 2 and the table 6 integral with the carriage 60. Namely, the conjoining portion 28 is raised above an upper portion 41 of the necked portion 59 integral with the carriage 60 of the slider 2. The conjoining portion 28 bulges sidewise out through between the sealing panel 4 and the side coverings 3 and further extends upwards into the flanges for the table 6. Thus, the table 6 is constituted with the flanges which extend lengthwise along both of widthwise opposite side edges of the sealing panel 4 and bulge sidewise to get exposed outside beyond the side edges of the sealing panel 4. On the upper surface of the flanges for the table 6, there are formed the mounting surfaces 14, which are used to fasten other components, such as the workpiece and so on, to the slider 2. As the slider 2 moves linearly, the sealing panel 4 is guided with the guide roller 31, which is installed across the flanges of the table 6, in a fashion that the sealing panel 4 once ascends gradually to reach from the upper surfaces of the side coverings 3 to above the upper portion 41 of the carriage 60 and then descends again to the upper surfaces of the side coverings 3.

The table covering 7 is screwed down on the table 6 after having been overlaid from above the table 6 with only the mounting surfaces 14 being exposed outside, and further having wrapped the surroundings of the table 6 so as to close a clearance between the upper surfaces of the side coverings 3 and the sealing panel 4 raised or lifted above the side covering 3. Moreover, the guide rollers 31, 32 are arranged between widthwise opposite inward surfaces of the flanges of the table 6. In particular, the guide rollers 31, 32 to lead the sealing panel 4 as shown in FIG. 6 are installed for rotation through bearings 45 which fit into holes bored in the flanges. Of three guide rollers 31 and 32 supported for rotation at their opposite ends with the bearings 45 to extend across the flanges of the table 6, the guide roller 31 alone is placed at the lengthwise middle of the table 6 to rotate while engaging with a lower side of the sealing panel 4. Two other guide rollers 32 are placed at leading and trailing ends of the table 6, one to each end, to lead while pressing from above the sealing panel 4. The guide roller 32 lying upstream of the sliding direction keeps the sealing panel 4 from ascending towards the guide roller 31 so that the upstream guide roller 32 serves as a starting point where the sealing panel 4 rises off the level of the upper plates 56 of the side coverings 3. On the other hand, the guide roller 32 lying downstream of the sliding direction presses down the sealing panel 4, which has once raised above by the guide roller 31, against the side coverings 3. The guide rollers 31 and 32 have linings made of, for example, a resinous material.

Generally, the actuators used in the clean room is designed to suck up and then spew out of the clean room, the dirt and dust occurring due to the operation of the actuator so as not to release the air with airborne dirt and dust in the clean room. The distinctive requisites of the present invention are to realize the high clean class 3 with a lower amount of air suction. The constructional features to provide the clean environmental actuator befitted for the high clean class will be described in detail later.

Figure 8:
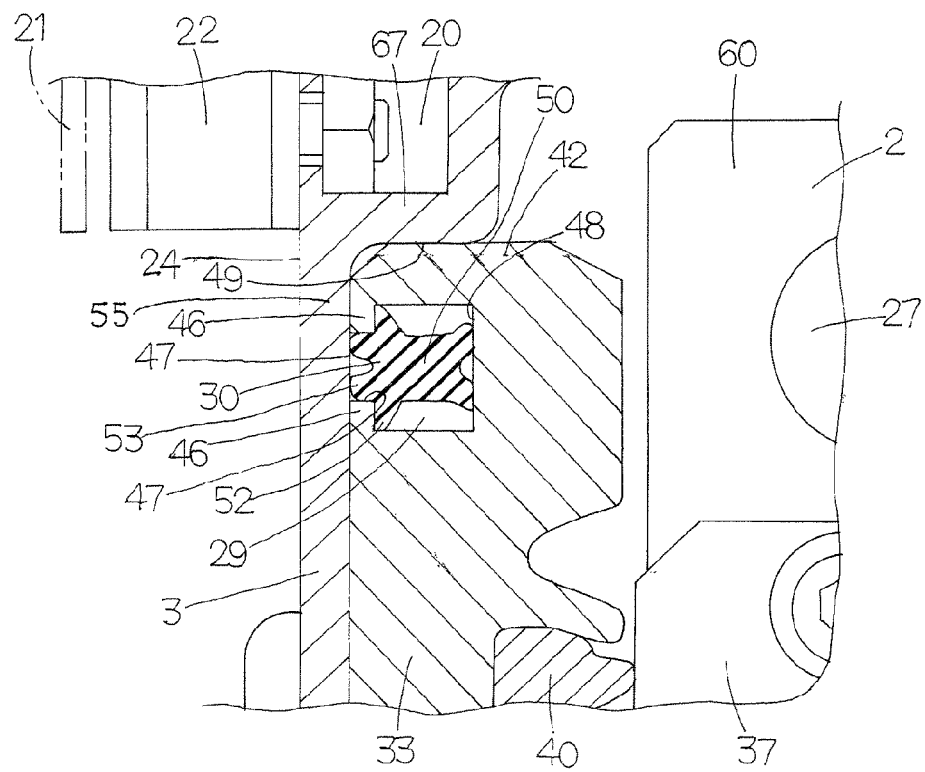
FIG. 8 is a fragmentary enlarged view showing in detail a part encircled with C in FIG. 4 of the actuator of the present invention.
Figure 9:
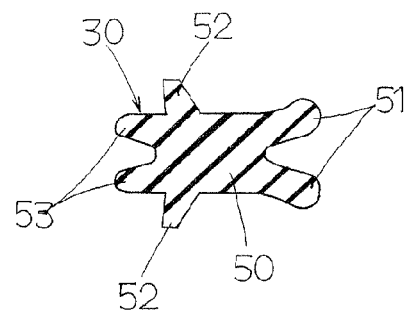
FIG. 9 is a view in cross section of a packing used in the actuator of FIG. 4.

The first constructional feature in the present invention resides in the enclosure 1 enhanced in airtightness. The packings 30 as shown in FIGS. 4, 5, 8 and 9 are installed between the side coverings 3 and the bed 5 to close the clearances left between them. To this end, the packings 30 are installed using the T-slots 29 which have conventionally existed lengthwise of the side walls of the prior bed to install any sensors therein. More particularly, the packings 30 are each shaped to have a specific configuration in a transverse section conformable to the existing T-slots 29 and also adapted to fit snugly between the bed 5 and the side coverings 3. Thus, the packings 30 are each installed throughout the overall length of the relevant T-slot 29. Each of the packings 30, as shown in FIGS. 8 and 9, is made of elastically deformable material such as a rubber or the like. Each packing 30 is constituted with a packing major part 50, a pair of locking parts 52 bulging sidewise out from sides of the major part 50 to make engagement with flanged portions 46 of the T-slot 29, forked bottom lips 51 extending out from a bottom of the major part 50 to come into abutment against a bottom surface 48 of the T-slot 29 to support securely the packing 30, and forked sealing lips 53 extending out from a top of the major part 50 to extend through an opening 47 of the T-slot 29 so as to come into flexible or soft abutment against the side coverings 3. Thus, the packings 30 can seal effectively the clearances between the bed 5 and the side coverings 3 by means of screwing the packings 30 only at their opposite ends on the end bracket 9 and the motor bracket 10.

The second constructional feature resides in making the space inside the housing 1 as small as possible. In particular, the grooves 20 of T-slot to install sensors therein are formed deep in the side coverings 3 in such a way so as to be surrounded with walls of the side coverings 3 to sink into the enclosure 1. Moreover, the walls defining the grooves 20 at their bottom portions 67 are made into shoulders 49 which are able to be snugly placed against the tops 42 of the side walls 33 of the bed 5 to support or place the side coverings 3 on the side walls 33 with accuracy, safety and ease. The accurate placement of the side coverings 3 on the bed 5 as stated just earlier is effective to keep the airtightness of the sealing panel 4 to hermetically seal between the side coverings 3 and the bed 5.

The third constructional feature resides in the prevention of the pumping phenomenon caused by back-and-forth movement with high speed and/or acceleration/deceleration of the slider 2 in the lengthwise direction of the bed 5 inside the enclosure 1 of which the interior space is smaller in volume, that is, the prevention of leakage of compressed air, which is caused after the sealing panel 4 covering from above the bed 5 has be edged out by the effect of air compressed in, for example the forward or leading space in front of the slider 2. To this end, the slider 2 has the vents 27 extending lengthwise through between forward and aft ends of the slider 2 at locations a little closer to the sealing panel 4. It is to be noted that the vents 27 have a shape and a caliber having a little or negative affect on the mechanical strength of the slider 2. In one version, the vents 27 each have the circular shape and a caliber given from test results.

The fourth constructional feature resides in the placement of the suction ports 15 in the motor bracket 10 and the suction ports 25 in the end bracket 9. In particular, the suction ports 15 and 25 are placed at locations where the air with airborne dust and dirt is liable to arise, for example, in the neighborhood of the bearings. That is, a pair of the suction ports 25 are made at the end bracket 9 near the bearing for the ball screw shaft 36 and a pair of the suction ports 15 are disposed on both sides of the coupling box 16 of the motor bracket 10. On the side of the motor bracket 10, an end part having therein the bearing to support one end of the ball screw shaft 36 is provided with a pair of communicating holes (not shown) which is open to the space inside the enclosure 1 and further the suction ports 15 interconnecting with the communicating holes are made in side walls of the coupling box 16 which is connected to the end part to receive therein a coupling set to join the motor 8 to the ball screw shaft 36.

The fifth constructional feature resides in that all the bed 5, slider 2, table 6 integral with the slider 2, end bracket 9, motor bracket 10 and the side coverings 3 are made of extrusions of light metals weighing less than steel and the race members 40, 61 installed in the bed 5 and the slider 2 to provide races through which the rolling elements roll are made of drawn steel. Thus, the actuator of the present invention may be reduced in weight and height in a transverse section, and be more compact in construction, even while ensuring high mechanical strength and highly accurate location and further conforming to high speed operation and high acceleration/deceleration. In addition, there is no need of the provision of any separate sensor rails because there are provided the grooves 20 to install the sensor in the side coverings 3.

What is claimed is:

1. An actuator suitable to work in clean environment, comprising:
    an elongated bed of U-shape in a transverse section having a bottom plate and a pair of side walls standing at side edges of the bottom plate to extend lengthwise in parallel with each other,
    a slider movable lengthwise between the pair of side walls of the bed through rolling elements,
    a driving unit to force the slider back-and-forth with respect to the bed,
    an enclosure shrouding lengthwise opposite ends, lengthwise side surfaces and tops of the bed, and
    a table integral with the slider and exposing itself out from the tops of the enclosure;
    wherein the enclosure comprises:
        an end bracket covering one end of the bed,
        a motor bracket covering another end of the bed,
        a pair of side coverings enclosing the lengthwise side surfaces and tops of the pair of side walls of the bed, one to each side wall,
        a sealing panel covering from above an upward opening between the pair of side coverings, and
        a table covering overlaying from above an area of the sealing panel lying on an upper surface of the slider and side areas of the table bulging sidewise out from side edges of the sealing panel;
    wherein each of the side walls of the bed have a first T-slot groove into which a packing fits to make close engagement or contact with the pair of side coverings enclosing the pair of side surfaces of the bed to hermetically close a clearance between each of the side coverings and the bed,
    wherein the packing comprises:
        a packing major part fitting into the first T-slot groove,
        a locking part bulging out from the major part to make engagement with flanged portions of the first T-slot groove,
        a bottom lip extending out from the major part to come into abutment against a bottom of the first T-slot groove, and
        a sealing lip extending out from the packing major part to extend through an opening of the first T-slot groove so as to come into close contact with the pair of side coverings;
    wherein each of the side coverings has a substantially L-shape in a transverse section, and comprises:
        a lengthwise side plate to come into close engagement with one of the lengthwise side walls of the bed and
        a lengthwise upper plate lying perpendicular to the side plate to extend over the top of the side wall, the side plate being depressed inwardly of an outward surface of the side plate at a location above the side wall of the bed along a lengthwise corner of the L-shape in a transverse section, thereby forming a second T-slot groove to install a sensor therein and
        a bottom of a wall to define the second T-slot groove is formed into a shoulder which is snugly placed against the to of the side wall of the bed;
    wherein the slider has vents extending lengthwise through the slider between forward and aft ends of the slider at an upper location closer to the table to prevent a pumping phenomenon caused by movement of the slider in a closed interior space inside the enclosure; and
    wherein the driving unit comprises:
        a motor and a ball screw assembly, the ball screw assembly being comprised of a ball screw shaft driven by the motor and supported for rotation at lengthwise opposite ends by bearings in the end bracket and the motor bracket, and
        a lead nut or ball screw nut mating with the ball screw shaft and fastened to the slider, and
    wherein the end bracket and the motor bracket each have a pair of suction ports to suck air with airborne dirt and dust out of the enclosure, the suction ports being disposed neighboring the lengthwise opposite ends of the ball screw shaft bearings, where the airborne dirt and dust are most liable to occur.

* * * * *